United States Patent [19]

Zierhut

[11] Patent Number: 4,795,905

[45] Date of Patent: Jan. 3, 1989

[54] CIRCUIT LAYOUT FOR AN INFRARED ROOM SURVEILLANCE DETECTOR

[75] Inventor: Hermann Zierhut, Munich, Fed. Rep. of Germany

[73] Assignee: Richard Hirschmann Radiotechnisches Werk, Fed. Rep. of Germany

[21] Appl. No.: 895,442

[22] Filed: Aug. 11, 1986

[30] Foreign Application Priority Data

Aug. 9, 1985 [DE] Fed. Rep. of Germany ....... 3528646

[51] Int. Cl.$^4$ .................................................. G01J 1/44
[52] U.S. Cl. .................................. 250/338.1; 250/342
[58] Field of Search .......................... 250/338 PY, 342; 340/567; 307/360, 361

[56] References Cited

U.S. PATENT DOCUMENTS

| | | | |
|---|---|---|---|
| 3,657,644 | 4/1972 | Beam et al. | 250/338 |
| 4,149,160 | 4/1979 | Bozarth et al. | 340/661 |
| 4,198,564 | 4/1980 | Baker et al. | 250/338 |
| 4,384,207 | 5/1983 | Doctor | 250/338 |
| 4,418,335 | 11/1983 | Genähr | 340/565 |

FOREIGN PATENT DOCUMENTS

| | | | |
|---|---|---|---|
| 0049493 | 4/1982 | European Pat. Off. . | |
| 2816580 | 11/1978 | Fed. Rep. of Germany . | |
| 0157672 | 12/1979 | Japan | 250/338 |
| 0106326 | 8/1980 | Japan | 250/338 |
| 59-22733 | 4/1985 | Japan . | |
| 1551541 | 8/1979 | United Kingdom . | |

OTHER PUBLICATIONS

*Microelectronics,* Jacob Millman, 1979.
"Aufspueren von Infrarotstrahlen", Funkschau, Apr. 1982, Helmut Israel.
Tietze -Schenk, Halbleiter-Schaltungs-Technik, 7. Auflage, 1985, pp. 142, 143.
Semiconductor Data Library, vol. 5, Series B, Motorola 1976.
"Elektronik", 1972, *Berichte aus der Elektonik,* by Dipl.-Phys. Hanns-Peter Siebert.

*Primary Examiner*—Janice A. Howell
*Attorney, Agent, or Firm*—Robert J. Koch

[57] ABSTRACT

A circuit layout operating in the current mode for an infrared room surveillance detector includes a high impedance operational amplifier connected directly to a pyroelement used as an infrared sensor. This results in a high sensitivity detector circuit with a low noise component in the detector output signal and maintaining a high impedance detector circuit. The detector circuit has a constant amplification over a relatively broad frequency range. The reaction resistor of the operational amplifier is chosen to have a high impedance, preferably in a range higher than $10^{11}$ Ohm. It is advantageous to take the reference voltage required for the evaluation of the detector output signal from the operational amplifier, so that aside from the simplified circuit layout, no further structural parts capable of increasing the interference sensitivity of the detector circuit are required. To further increase the electromagnetic compatibility, the threshold value comparator stage may also be located in the detector housing.

9 Claims, 2 Drawing Sheets

CIRCUIT LAYOUT FOR AN INFRARED ROOM SURVEILLANCE DETECTOR

BACKGROUND OF THE INVENTION

1. Field of the Invention

The invention relates to a circuit layout for an infrared room surveillance detector comprising a pyroelement sensor, and more particularly, a circuit layout operated in current mode and containing an operational amplifier with an output signal conducted to a threshold value comparator stage.

2. Description of the Related Technology

Detector circuits used in combination with pyroelements serving as infrared sensors, usually are detectors operated in the voltage mode. Detectors operated in the voltage mode have a high impedance required by the further processing of the detector output signal by, for example, a threshold value comparator stage. The disadvantage of such detectors operating in the voltage mode is that detector sensitivity is inadequate and, in particular, that detector amplification decreases at high frequencies. The significance of this is that the degree of amplification and thus the output voltage varies with the frequency.

Use of a detector operating in the current mode in combination with a pyroelement serving as an infrared sensor has been proposed. This leads to a higher detector sensitivity. The detector has a constant amplification factor over a relatively broad frequency band including higher frequencies representing a particular advantage in actual use. The disadvantage of such a detector operating in the current mode is that is has a relatively low impedance. It has therefore been proposed in connection with the present invention to insert between the pyroelement and an operational amplifier an impedance converter in the form of a field effect transistor (FET). This provides the high impedance required, but the use of an impedance converter or an FET has the considerable disadvantage that the detector becomes appreciably more susceptible to external electromagnetic interference and the electromagnetic compatibility (EMV) required by the receiving authority cannot be assured.

SUMMARY OF THE INVENTION

It is an object of the invention to provide a circuit layout for an infrared detector with high sensitivity and low noise, having constant amplification over a relatively broad frequency range and nevertheless possessing high impedance.

This object is attained according to the invention by an operational amplifier with high impedance connected directly to the terminals of the pyrometer.

The circuit according to the invention enables use of a detector operating in the current mode in combination with a pyroelement. The detector exhibits a high impedance and still is highly sensitive and low in noise, while exhibiting uniform amplification over a relatively broad frequency range. In connection with the present invention, the inventor has conducted investigations with a great variety of detectors for use in combination with pyroelements for infrared room surveillance systems. In contrast to the general opinion of those skilled in the art, it was found that it is possible to use a detector operating in the current mode without an impedance converter, thereby rendering noise, provided that a high impedance operational amplifier is used for the detector and is connected directly with the terminals of the pyroelement.

It should be noted that either a single or a double pyroelement may be used, without affecting the principles of the present invention.

According to a preferred embodiment of the invention, the reaction resistance or input impedance of the operational amplifier is high, preferably with a range $10^{11}$ to $10^{12}$ Ohm. In this manner the output signal of the detector located in the detector housing can be made high enough so that the threshold comparator stage required for signal evaluation may be actuated without any additional amplification. Amplification therefore takes place in the detector housing only and amplifiers located outside the housing may be eliminated. This further reduces the sensitivity of the detector to interference, as there is no external amplifier receiving interference from the outside.

It is particularly advantageous to connect the reference voltage from the operational amplifier reference voltage from the detector to the comparator stage reference voltage. Interference sensitivity is thereby further reduced as no external circuits for generation of the comparator stage reference voltage are required. In addition, the overall circuitry of the detector is reduced. A further particular advantage of the use of the operational amplifier reference voltage for the comparator stage also is that fluctuations of the operating voltage do not affect the threshold comparator function, because the voltage reference point for the comparator stage varies with the operating voltage and the comparator reference point thus "floats" with the fluctuations of the reference voltage. Taking the reference voltage from the operational amplifier of the detector as the comparative voltage of the actuating thresholds of the comparator stage is possible in particular when the reaction resistance or input impedance is high, so that practically no load is applied.

In a further embodiment of the invention the comparator stage is integrated in the detector housing. In this manner, the detector is made even less sensitive to interference and its electromagnetic compatibility enhanced.

In an embodiment of the present invention, a blocking diode or a transistor connected as a blocking diode is between the negative terminal of the operating voltage source and the reference voltage output, and between the reference voltage output and the operation voltage source positive terminal. Static charges, which may occur in particular during the manufacturing process, generate high voltage peaks or spikes, which can impact the operational amplifier and destroy it if no diodes are present. The danger is when CMOS technology is used. The diodes or the transistors configured as diodes are located preferably in the detector housing. If there is insufficient room in the detector housing, it is possible to provide a blocking diode or a transistor connected as a blocking diode, between the negative terminal of the operating voltage source and the reference voltage outlet only located inside the detector housing. A resistance located outside the detector housing is then provided between the reference voltage outlet and the positive terminal of the operating voltage source.

It is especially advantageous if the diode or diodes are Zener diodes or transistors connected as Zener diodes. According to a further feature, operating voltages are introduced through a series resistor thereby additionally stabilizing the operating voltage with the use of Zener diodes, without requiring additional parts or measures.

It may further be of advantage to connect the negative terminal of the operating voltage source to ground and only connect the positive operating voltage through a series resistor.

BRIEF DESCRIPTION OF THE DRAWINGS

The invention will become more apparent from the example described below with reference to the drawings. In the drawings.

DETAILED DESCRIPTION OF THE PREFERRED EMBODIMENT

Figure 1:
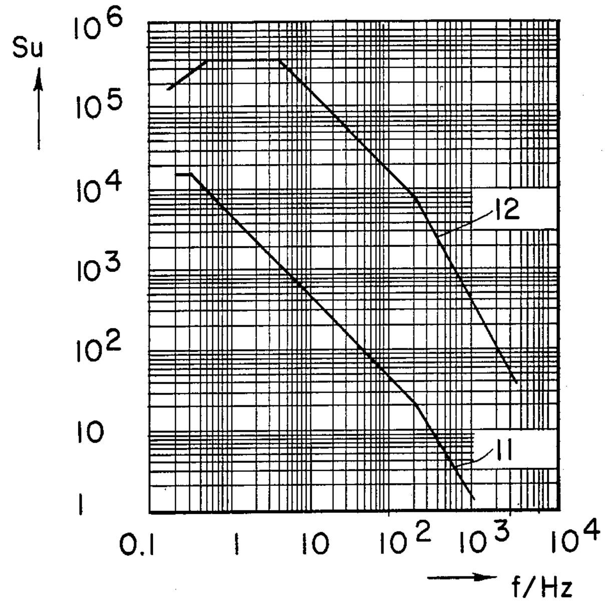
FIG. 1 shows the characteristic amplification for the detector circuit in the voltage and current modes as a function of frequency.

FIG. 1 shows an amplification characteristic 11 for a detector operating in the voltage mode and the amplification characteristic 12 for a detector operating in the current mode as a function of frequency. As mentioned above, it is desirable for a detector used in combination with infrared sensors to exhibit an essentially constant amplification over the operating frequency range. As seen in FIG. 1, this requirement cannot be attained with a detector operating in the voltage mode. In contrast, the amplification characteristic of a detector operating in the current mode has a straight line configuration over a relatively broad range toward higher frequencies, i.e., it has constant amplification over a relatively broad frequency range, so that the current mode is significantly more suitable for a detector in this respect.

Figure 2:
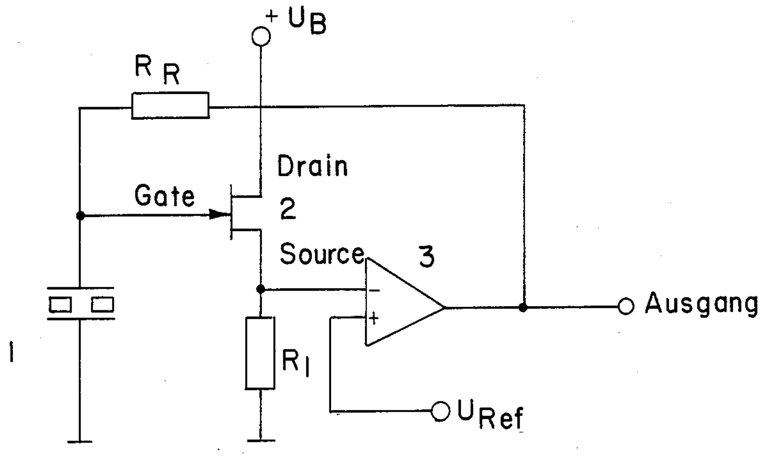
FIG. 2 shows a detector circuit operating in the current mode with an impedance converter.

However, a detector operating in the current mode does not have adequate impedance, so that an impedance converter must be provided in the detector circuit. FIG. 2 shows a detector operating in the current mode with an impedance converter.

One terminal of a pyroelement 1, which may be a single or a double element, is connected to ground or the negative terminal of the operating voltage source. The other terminal of the pyroelement 1 is connected to the gate electrode of a field effect transistor (FET) 2, the drain electrode whereof is connected to the positive terminal of an operating voltage source $U_B$. The source electrode of the FET 2 is connected through a resistor $R_1$ to ground or the negative pole of the operating voltage source and directly to the minus input of an operational amplifier 3. The reference voltage $U_{Ref}$ is connected to the plus input of the amplifier 3. A reaction or feedback resistor $R_R$ is inserted between the gate electrode of the FET 2 and the outlet of the operational amplifier 3. The output signal of the circuit layout, for example a threshold value comparator stage for evaluation.

The impedance converter inserted in front of the amplifier in the form of a junction FET 2 has the disadvantage that the voltage noise of the FET fully enters the signal to be evaluated. The voltage noise of the FET is in particular generated appreciably by the ohmic feedback admittance acting between the drain electrode and the gate electrode.

Figure 3:
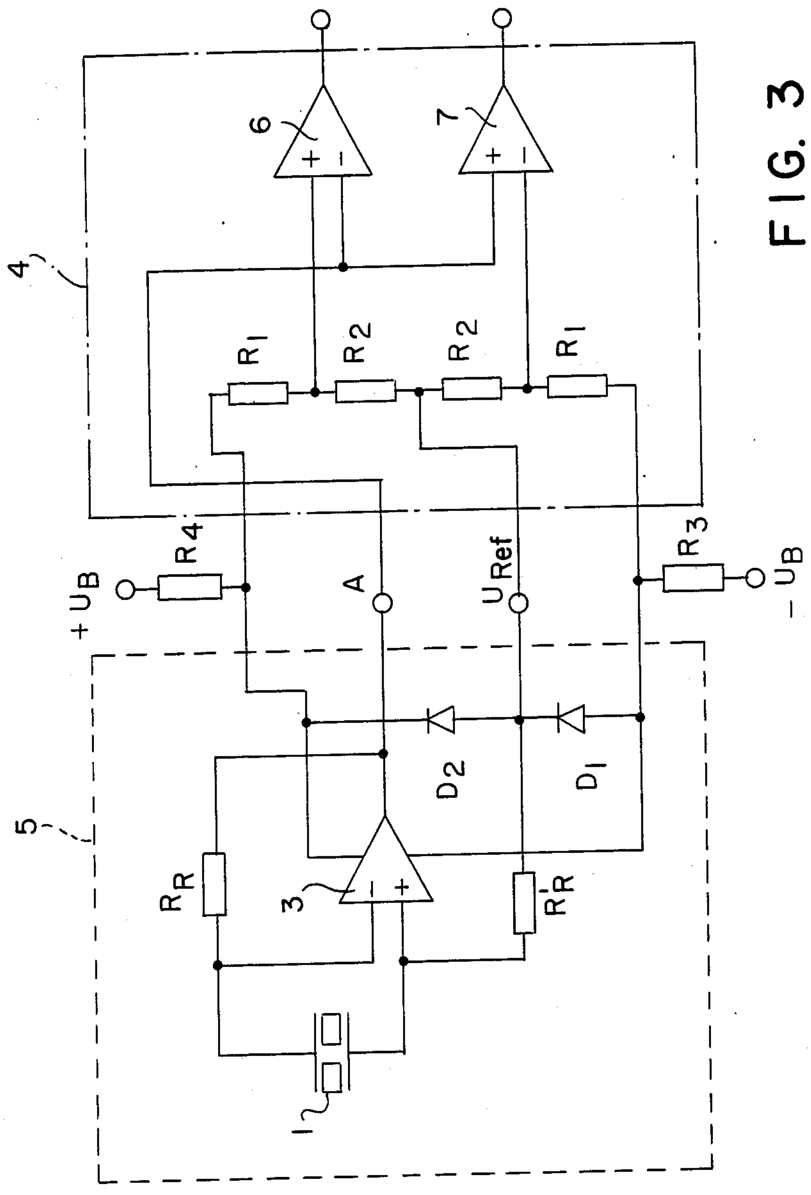
FIG. 3 shows an example of the circuit layout according to the invention for a detector operating in the current mode.

FIG. 3 shows an embodiment of a circuit layout according to the invention for a detector used in combination with a pyroelement. One of the pyroelement terminals is directly connected to the negative input of an operational amplifier 3. The other pyroelement terminal is directly connected to the positive input of the operational amplifier 3. A reaction or feedback resistor $R_R$ is connected between the output and the negative input of the operational amplifier 3. The output signal of the operational amplifier is the detector signal A to be evaluated in a subsequent circuit layout; it is passed for example to a threshold value comparator stage 4. The operating voltages $+U_B$ and $-U_B$ are connected to the operational amplifier 3.

It was discovered in the investigations of detectors used when pyroelements are employed as infrared sensors that, in contrast to the views of those skilled in the art, a detector operating in the current mode may be used without an impedance converter, when the detector is constructed in the manner shown with the inlets of a high impedance operational amplifier 3 connected directly to the terminals of the pyroelement 1. In this fashion, a detector impedance sufficiently high to satisfy requirements is obtained. Preferably BiMOS or CMOS operational amplifiers are used in the present invention.

It is further advantageous to choose the reaction resistor $R_R$ as high as possible, preferably higher than $10^{11}$ Ohm, for example $10^{12}$. This renders the output signal high enough so that any further amplification prior to the processing of the signal in the threshold comparator stage 4 may be omitted. Aside from the simplified structural configuration, this has the advantage that no additional structural elements are present to receive external interferences and to make the detector susceptible to such interferences.

The reference symbol 5 indicates the detector housing. It contains the afore-described circuit layout parts of the detector circuit, which are essentially protected by the housing 5 against interference from the outside.

For reasons of symmetry, the reference voltage $U_{Ref}$ is preferably chosen so that it is located approximately in the center of the dynamic range of the outlet voltage of the operational amplifier, which in the case of the use of CMOS amplifiers—which as mentioned above, are especially suitable —corresponds to approximately one-half of the operating voltage.

In the embodiment shown in FIG. 3, the reference voltage $U_{Ref}$ is taken by a resistor $R'_R$ corresponding to the reactor resistor $R_R$ from the operational amplifier 3 used and lead out of the reactor housing 5. The operational amplifier is thereby relieved of practically any load due to the high resistance of $R'_R$.

The conduction of the reference voltage from the detector housing and its use simultaneously as the reference voltage for the subsequent comparator circuit results in a reduced circuit layout and a lower sensitivity to interference. No external circuits are required which reduces the possibility of receiving interferences. Furthermore, an additional essential advantage is that the threshold value comparator stage remains practically unaffected by operating voltage fluctuations as the voltage reference points lead out of the detector to the comparator stage and vary with fluctuations of the operating voltage.

To protect the structural parts located in the detector housing, the diodes $D_1$ and $D_2$ may be used; they are provided in the manner shown in FIG. 3 in the circuit layout.

The anode of a diode $D_1$ is connected to the negative terminal $-U_B$ of the operating voltage source and its cathode to the reference voltage output $U_{Ref}$; the latter is connected to the anode of diode $D_2$, the cathode whereof is connected with the plus terminal $+U_B$ of the operating voltage source. These diodes serve to protect the structural parts located in the detector housing, in particular the operational amplifier 3. In place of the diodes, transistors connected as diodes may be used.

In the embodiment shown, the operating voltages $-U_B$ and $+U_B$ are introduced through the resistors $R_3$ and $R_4$. If Zener diodes are used as the diodes $D_1$ and $D_2$, a stabilization of the operating voltage is obtained without an additional circuit effort.

The threshold value comparator stage 4 to evaluate the detector signal A, comprises two comparators 6 and 7 which may be operational amplifiers. The output signal A of the operational amplifier 3 is connected to the negative input of comparator 6 and the positive input of comparator 7. The reference voltage $U_{Ref}$ is applied through the threshold value setting resistors $R_1$ and $R_2$ to the positive input of comparator 6 and the negative input of comparator 7.

To further simplify the layout and in particular to improve its electromagnetic compatibility, the threshold value comparator stage 4 may be located in the detector housing 5. In this manner, this particular circuit is also essentially shielded against interference from the outside.

As shown in FIG. 1, there is a high frequency decline in the frequency-amplification curve for a detector operating in the current mode (characteristic 12) caused by the decline of the open circuit amplification of the operational amplifier. An operational amplifier 3, which exhibits constant open circuit amplification over the frequency range desired is preferably chosen for this reason. Optionally, two operational amplifiers may be connected in series for the purpose. Open circuit amplification within a useful range of 120 dB is rational. The compensation of the operational amplifier, i.e., the breaking point of the open circuit amplification should be outside the useful or operational range.

The invention has been described above with the aid of an exemplary embodiment. The scope of the invention includes, however, modifications and embodiments those skilled in the art may make without departing from the concepts of the invention.

I claim:

1. An infrared space surveillance detector circuit comprising:

means for sensing wherein said means for sensing is a pyroelement;

a detector stage with a high impedance operational amplifier configured as a current amplifier directly responsive to said means for sensing;

means for performing a threshold value comparison responsive to an output of said operational amplifier.

2. An infrared space surveillance detector circuit according to claim 1, further comprising a feedback resistor connected between an input of said operational amplifier and said output of said operational amplifier, wherein said feedback resistor exhibits a resistive value of at least $10^{11}$ ohm.

3. An infrared space surveillance detector circuit according to claim 2, wherein said detector stage further comprises means for generating a reference signal and wherein said reference signal is connected to said means for performing a threshold value comparison.

4. An infrared space surveillance detector circuit according to claim 3, comprising:

means for housing said detector stage wherein said means for performing a threshold value comparison is located within said means for housing.

5. An infrared space surveillance detector circuit according to claim 3 further comprising a first blocking diode connected between a negative operating voltage input of said operational amplifier and said reference signal and a second blocking diode connected between said reference signal and a positive operating voltage input of said operational amplifier.

6. An infrared space surveillance detector circuit according to claim 5 wherein said first blocking diode and said second blocking diode are Zener diodes.

7. An infrared space surveillance detector circuit according to claim 5 further comprising a second resistor connected between a negative operating voltage source and said negative operating voltage input; and a third resistor connected between a positive operating voltage source and said positive operating voltage input.

8. An infrared space surveillance detector circuit according to claim 5 further comprising a third resistor connected between said positive operating voltage input and a positive operating voltage source and wherein said negative operating voltage input is connected to ground.

9. An infrared space surveillance detector circuit according to claim 3 further comprising a means for housing said detector stage;

a first blocking diode connected between a negative operating voltage input of said operational amplifer and said reference signal wherein said first blockind diode is located within said means for housing; and a first resistor, connected between a positive operating voltage input of said operational amplifier and said reference signal, located outside said means for housing.

* * * * *